Sept. 18, 1923.  E. HEBERT  1,468,069
BREAD TOASTER
Filed May 21, 1923

Inventor
Erminie Hebert,
By Bright & Bailey
Attorneys

Patented Sept. 18, 1923.

1,468,069

UNITED STATES PATENT OFFICE.

ERMINIE HEBERT, OF HAMMOND, LOUISIANA.

BREAD TOASTER.

Application filed May 21, 1923. Serial No. 640,439.

*To all whom it may concern:*

Be it known that I, ERMINIE HEBERT, a citizen of the United States, and resident of Hammond, in the parish of Tangipahoa and State of Louisiana, have invented certain new and useful Improvements in Bread Toasters, of which the following is a specification.

My invention relates to bread toasters and particularly that type comprising a perforated pan element upon which is superimposed a mat member including a wire mesh portion upon which latter the bread slices are adapted to rest during the operation of toasting.

It is the purpose of my present invention to enhance the sanitary qualities of bread toasters of this type by constructing the pan element and mat member in such manner that they can be readily separated to afford convenient access to the interior of the pan element for the purpose of cleaning the latter of burnt crumb accumulation and other foreign matter.

It is also the purpose of my invention to provide a toaster of the type named wherein the handle member is formed of two sections, one of which is fixed to the mat member and the other pivoted to the pan element, said sections having formations at their free ends adapted to detachably interlock when the sections are forced together, said formations when interlocked also serving to prevent removal of the mat member from the pan element.

With the foregoing and other purposes in view my invention consists in the details of construction and in the arrangement and combination of parts to be hereinafter more fully described and particularly set forth in the claims.

In describing my invention in detail, reference will be had to the accompanying drawing wherein like characters of reference denote corresponding parts in the several views, and in which—

Figure 1:
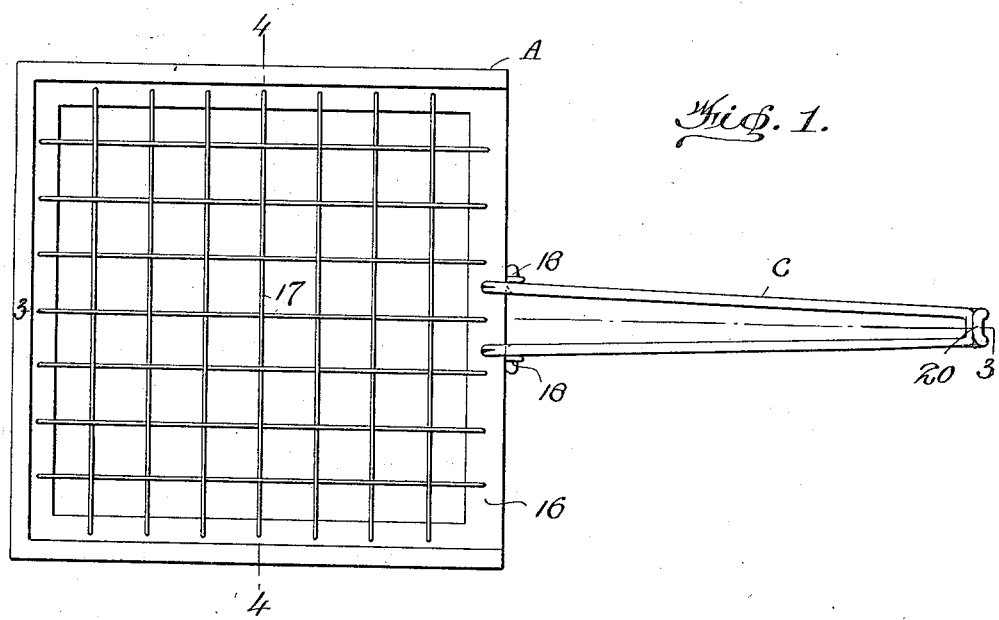
Figure 1 is a plan view of my improved toaster.
Figure 2:
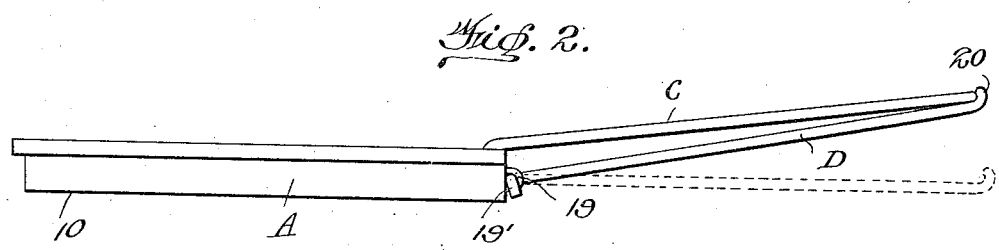
Figure 2 is a side elevation with the pivoted sections of the handle shown in dotted lines disengaged from the other section.
Figure 3:
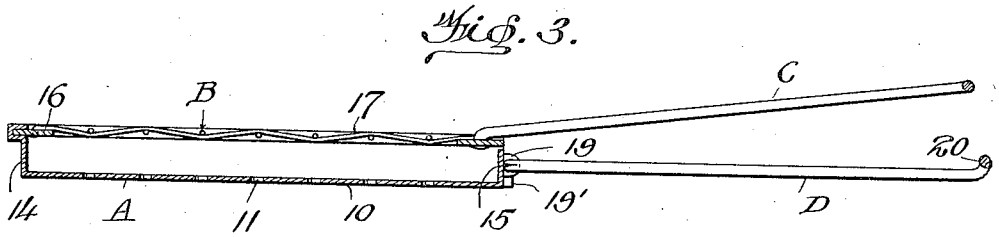

Figure 3, a section on the line 3—3 of Figure 1; and

Figure 4:
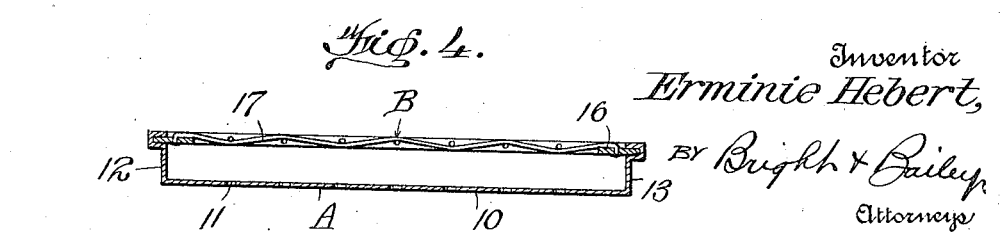

Figure 4, a section on the line 4—4 of Figure 1.

Referring to the drawing my improved toaster is shown as comprising a pan element A and a mat member B constructed of any suitable material, preferably aluminum. In form the pan element A includes a bottom 10 having perforations 11, side walls 12 and 13, a forward wall 14 and a rear wall 15. The side walls 12 and 13 and the forward wall 14 are provided at their upper edges with inwardly opening grooves disposed above the top edge of the wall 15 and in which the mat member B is slidably engaged. I construct this mat member of a frame 16, opposite sides of which are connected by wires 17 forming an interior mesh upon which the bread slices are adapted to rest in the operation of toasting.

The handle of my improved toaster is shown as comprising sections C and D, the former of which is fixed to the mat member and the latter pivoted to the rear wall 15. Both of the sections C and D are of single wire U-shape formation and the arms of the member D have laterally directed portions 18 which are pivoted respectively in suitable eye elements 19 fixed to the wall 15. The free ends of the portions 18 terminate in angular extensions 19 which are adapted to engage the wall 15 to limit pivotal movement of the section D as will be apparent. The outer end of the section D is curved as at 20, so as to spring over the outer end of section C when the sections are forced together and thus connect the sections and form in effect a unitary handle element for convenient holding of the assembled device in the operation of toasting. It will of course be apparent that when it is desired to remove the mat member for cleaning purposes, the sections C and D of the handle can be separated and the latter section pivoted to a position where it will not interfere with the section C during such removal of the mat member.

I claim:—

1. A toaster comprising a pan, a material supporting mat having slidable connection with walls of the pan for movement to and from operative position above the bottom thereof, and a handle for the toaster comprising detachably interlocking sections, one of which is upwardly inclined away from and fixed to the mat and the other pivoted to the pan, said pivoted section intersecting the path of sliding movement of the mat when the sections are interlocked and being movable away from the fixed section to a position completely below said path of movement when said sections are detached.

2. A toaster comprising a pan, a material supporting mat having slidable connection with walls of the pan for movement to and from operative position above the bottom thereof, a handle for the toaster comprising detachably interlocking sections, one of which is upwardly inclined away from and fixed to the mat and the other pivoted to the pan, said pivoted section intersecting the path of sliding movement of the mat when the sections are interlocked and being movable away from the fixed section to a position completely below said path of movement when said sections are detached, and means for limiting the movement of the pivoted section away from the fixed section.

In testimony whereof I hereunto affix my signature.

ERMINIE HEBERT.